United States Patent [19]

Koeppel et al.

[11] Patent Number: 5,801,902
[45] Date of Patent: Sep. 1, 1998

[54] SETTING BEARING PRELOAD UTILIZING THERMAL EXSPANSION/CONTRACTION

[75] Inventors: Klaus Dieter Koeppel, Watsonville; Robert Michael Pelstring, Santa Cruz; Alan Lyndon Grantz, Aptos; Steven Craig Knoche, Corralitos, all of Calif.

[73] Assignee: Seagate Technology, Inc., Scotts Valley, Calif.

[21] Appl. No.: 613,827

[22] Filed: Feb. 29, 1996

Related U.S. Application Data

[63] Continuation of Ser. No. 311,194, Sep. 23, 1994, abandoned.
[51] Int. Cl.⁶ .......................... G11B 17/02; F16C 33/04
[52] U.S. Cl. .................. 360/99.08; 310/90; 310/67 R; 360/98.07
[58] Field of Search .................. 360/99.04, 99.08, 360/98.07, 97.01; 310/67 R, 90; 384/49, 227, 228, 231, 275–278, 247, 281

[56] References Cited

FOREIGN PATENT DOCUMENTS

| | | | |
|---|---|---|---|
| 52-35807 | 3/1977 | Japan | 310/90 |
| 61-177139 | 8/1986 | Japan | 310/90 |
| 62-60458 | 3/1987 | Japan | 310/90 |
| 63-209446 | 8/1988 | Japan | 310/90 |
| 0322843 | 1/1991 | Japan | 310/90 |
| 4197057 | 7/1992 | Japan | 310/90 |
| 4244756 | 9/1992 | Japan | 310/90 |
| 0564390 | 3/1993 | Japan | 310/90 |
| 0576151 | 3/1993 | Japan | 310/90 |
| 5146128 | 6/1993 | Japan | 310/90 |
| 5268742 | 10/1993 | Japan | 310/90 |
| 5316681 | 11/1993 | Japan | 310/90 |

*Primary Examiner*—Stuart S. Levy
*Assistant Examiner*—William J. Klimowicz
*Attorney, Agent, or Firm*—Flehr Hohbach Test Albritton & Herbert LLP

[57] ABSTRACT

Bearings in a motor or bearing cartridge are positioned relative to the shaft and an outer sleeve, and a bearing retainer is then pressed against the outer races of one of the bearings in order to hold the bearings in position and preload the bearings in a desired orientation. The bearing retainer is chilled to a temperature significantly different than the sleeve with which it cooperates; shrinking the retainer to a size where it may be slip fit within a sleeve or other means for supporting the bearings in place. The retainer is then pressed against the outer races of the bearings, and held in place while it returns to the temperature of the sleeve within which it is fit. In this way, the preload is defined and maintained for the long term, as the retainer is pressed tightly against the outer race of the bearings; and the retainer is held within the sleeve as it returns to the same temperature being chilled is eliminated. In an alternative approach, the retainer ring may be heated to expand its internal diameter, and after being heated to a temperature which is greater than the sleeve, is slipped over the outside of the sleeve while the bearings are being held with the required preload.

34 Claims, 4 Drawing Sheets

SETTING BEARING PRELOAD UTILIZING THERMAL EXSPANSION/CONTRACTION

CROSS REFERENCE TO A RELATED APPLICATION

This is a continuation of application Ser. No. 08/311,194 filed Sep. 23, 1994, now abandoned.

The subject application is useful in most disk drives, a typical example is shown in U.S. application, Ser. No. 07/893,641 filed Jun. 5, 1992, now abandoned, assigned to the assignee of the present application and incorporated herein by reference.

The motor assembly techniques utilized here are especially useful in a motor of the type described in U.S. Pat. No. 5,617,212, filed May 2, 1994.

FIELD OF THE INVENTION

This invention relates to pivot bearing assemblies and particularly to an improved method of assembly of a spindle motor or pivot bearing design especially for use in a disk drive, wherein improved assembly techniques are utilized to reduce or minimize contaminants generated by motor or pivot bearing which might otherwise enter the sealed head disk assembly of the disk drive.

BACKGROUND OF THE INVENTION

Disk drive units in general are known in the art for use in modern micro computers such as personal and desktop computers. In the most common form, such disk drive units comprise a so-called Winchester disk drive having one or more rotatable memory storage disks mounted within a substantially sealed disk drive housing along with one or more related electromagnetic heads for reading and writing data on appropriately prepared surfaces of the disks. A disk drive of this type is sometimes referred to as a hard or a fixed disk drive and is normally available as a compact, complete package with a sealed housing on a rigid chassis or frame together with a circuit board carrying the necessary drive electronics.

Within the sealed disk drive, a rotating constant speed spindle motor is provided for mounting and rotating the disks. Because of the extremely fine tolerances in the internal components of the disk drive, especially the head and disk surfaces, the head-disk assembly is sealed against the outside air to prevent the entry of contaminants. However, it is also necessary to deal with and suppress the sources of contaminants within the disk drive. Currently, a primary source of the problem is that in order to minimize the size of the disk drive, modern spindle motors are designed with many components inside the hub which support the disks.

Typically, adhesives are widely used in spindle motors as a means to retain individual components within the assembly.

Adhesives are typically used in spindle motor to retain components such as bearings, shafts and bores precisely in their relative positions, and to maintain the bearing system in a preloaded condition. Because of the manufacturing sequence for spindle motors, and the difficult environmental conditions in which disk drives are used, the requirements for the adhesive used in the spindle motor are demanding and pose a difficult choice for the user. The adhesive requirements are that it maintain its structural integrity in the motor over temperature cycles which can range from −40° to 70° centigrade. The adhesive must further maintain its structural integrity under significant shocks. In order to avoid contaminating or providing any contaminants to the interior of the sealed disk drive, the adhesive must have a very low out-gasing characteristic.

Furthermore, in order to be consistent with the manufacturing sequence and not unduly delay the assembly of the motors, the adhesive must be capable of both a fast cure and a complete cure so that the spindle motor remains completely clean of any residue. The adhesive must be easy to dispense, and have limited components.

The actuator arm which positions the transducer over the spinning disc is also mounted on a pivot bearing assembly which is subjected to considerable stress as the arm moves rapidly over the disc surface. Thus the same problems with adhesives exist in such pivot bearings and make their elimination desirable.

SUMMARY OF THE INVENTION

It is the objective of this invention to provide a means and method for assembling the components of a motor bearing assembly or pivot bearing assembly, and meet the technical requirements of the motor for such a use without the use of adhesives in assembling the motor.

It is a further objective of the present invention to eliminate or substantially eliminate the use of adhesives in the assembly of spindle motors or bearing assemblies used in disc drives or other information storage systems, thereby diminishing or eliminating the adhesive out-gasing problem in the disk drive.

A further objective of the present invention is to provide an approach to assembly of a disk drive spindle motor which allows for fast, reliable assembly of the spindle motor or bearing assembly, and which eliminates the need for cure time for the adhesive.

Another objective of the present invention is to provide a low cost assembly method for a disk drive spindle motor or bearing assembly in which no adhesives are required to complete the assembly.

Yet another of the objectives of the present invention is to provide an accurate and reliable method of setting the bearing preload, without the use of adhesives which may allow for a modification of the initially set preload during the course of curing of the adhesive.

These and other objectives of the present invention are achieved in a spindle motor where in a preferred embodiment the bearings in the motor are positioned relative to the shaft and an outer sleeve, and a bearing retainer is then pressed against the outer races of one of the bearings in order to hold the bearings in position and preload the bearings in a desired orientation. In the preferred embodiment the bearing retainer is chilled to a temperature significantly different than the sleeve with which it cooperates; shrinking the retainer to a size where it may be slip fit within a sleeve or other means for supporting the bearings in place. The retainer is then pressed against the outer races of the bearings, and held in place while it returns to the temperature of the sleeve within which it is fit. In this way, the preload is defined and maintained for the long term, as the retainer is pressed tightly against the outer race of the bearings; and the retainer is held within the sleeve as it returns to the same temperature being chilled is eliminated.

In an alternative approach, the retainer ring may be heated to expand its internal diameter, and after being heated to a temperature which is greater than the sleeve, is slipped over the outside of the sleeve while the bearings are being held with the required preload. Typically, in this case at least one of the inner or outer races of the bearings will extend beyond the end of the sleeve so that they rest against the shoulder of the retaining ring in order that the preload can be permanently set and established. After the cap or retainer ring is put in place, it is allowed to cool down, setting the bearings in place and fixing the preload conditions.

Other features and advantages of the present invention will become apparent to a person of skill in the art who studies the present invention disclosure given with reference to the following drawings:

DETAILED DESCRIPTION OF THE DRAWINGS

DETAILED DESCRIPTION OF THE PREFERRED EMBODIMENT

Figures 2A, 2B, 2C:
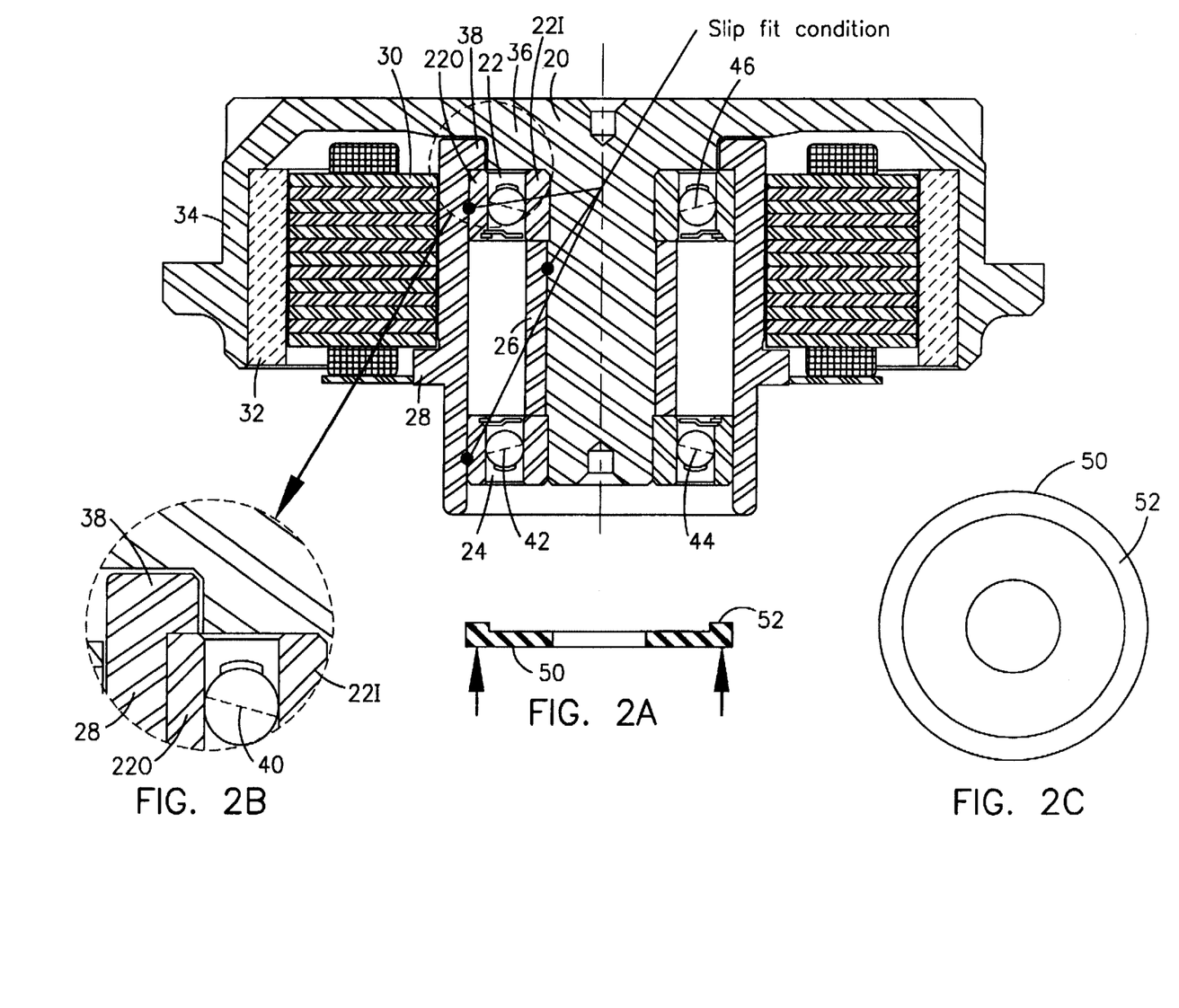
FIG. 2A is a vertical sectional view of a spindle motor of a type in which the present invention is especially useful.
FIG. 2B is an expanded sectional view of a portion of FIG. 2A.
FIG. 2C is a plan view of the preload spacer shown in FIG. 2A.
Figure 3:
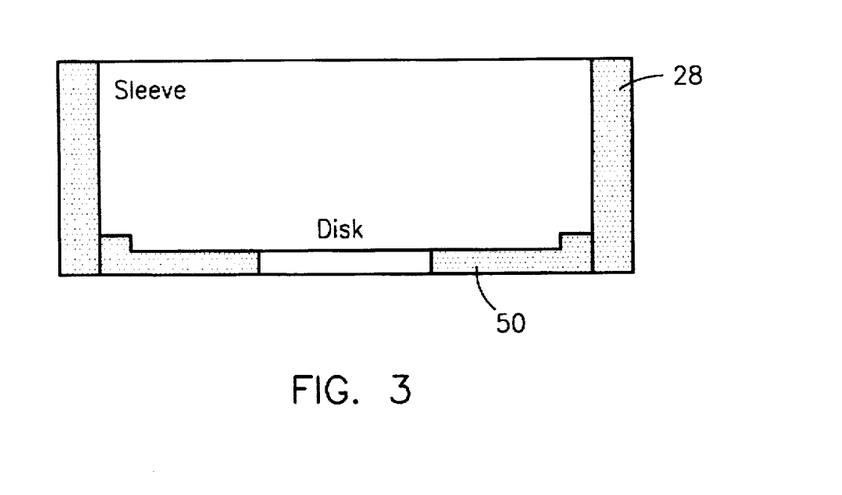
FIG. 3 is a partial sectional view illustrating the sleeve and retainer ring in FIG. 1 which was the basis of an analysis of the effectiveness of the design of FIG. 1.
Figure 4:
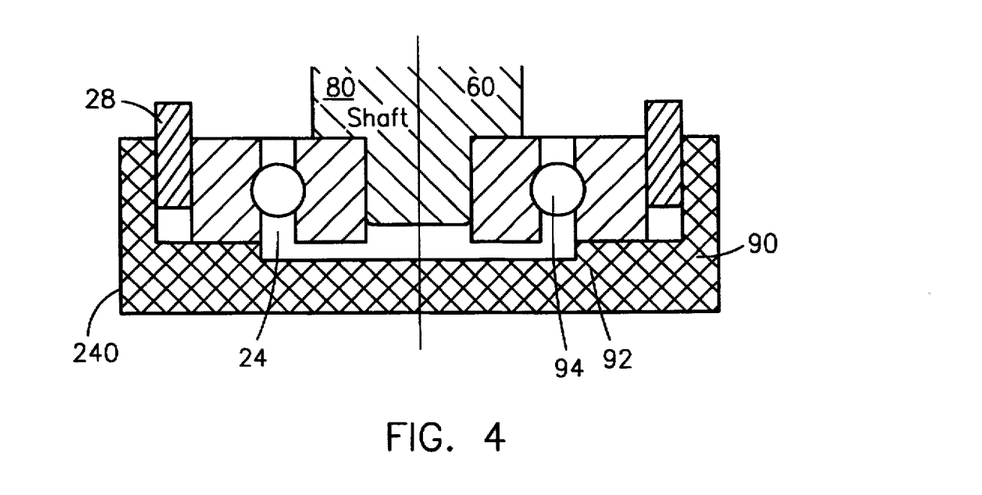
FIG. 4 is a partial sectional view of an alternative embodiment to the design of FIG. 2.
Figure 5:
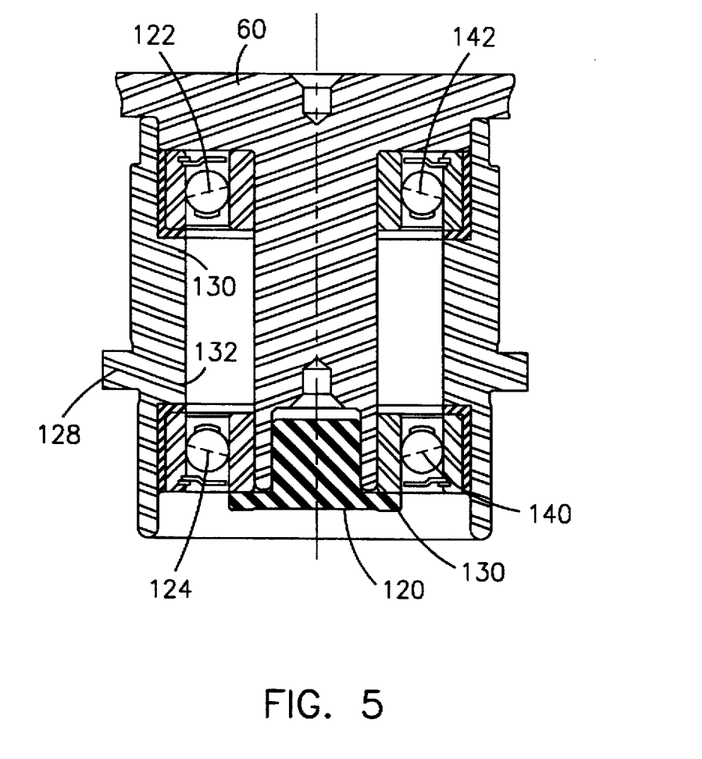
FIG. 5 is a vertical sectional view of a motor incorporating another design alternative utilizing the present invention.

The details of a bearing retainer which is used to assemble an adhesiveless motor according to the present invention is most readily apparent from the sectional view of FIG. 2A; alternative embodiments of adhesiveless motors using heat expanded or cold contracted elements to assemble the motor are seen in FIGS. 4 and 5. The analysis of the preferred embodiment of FIG. 2 and specifically the cold contracted bearing retainer is presented using the view of FIG. 3.

Figure 1:
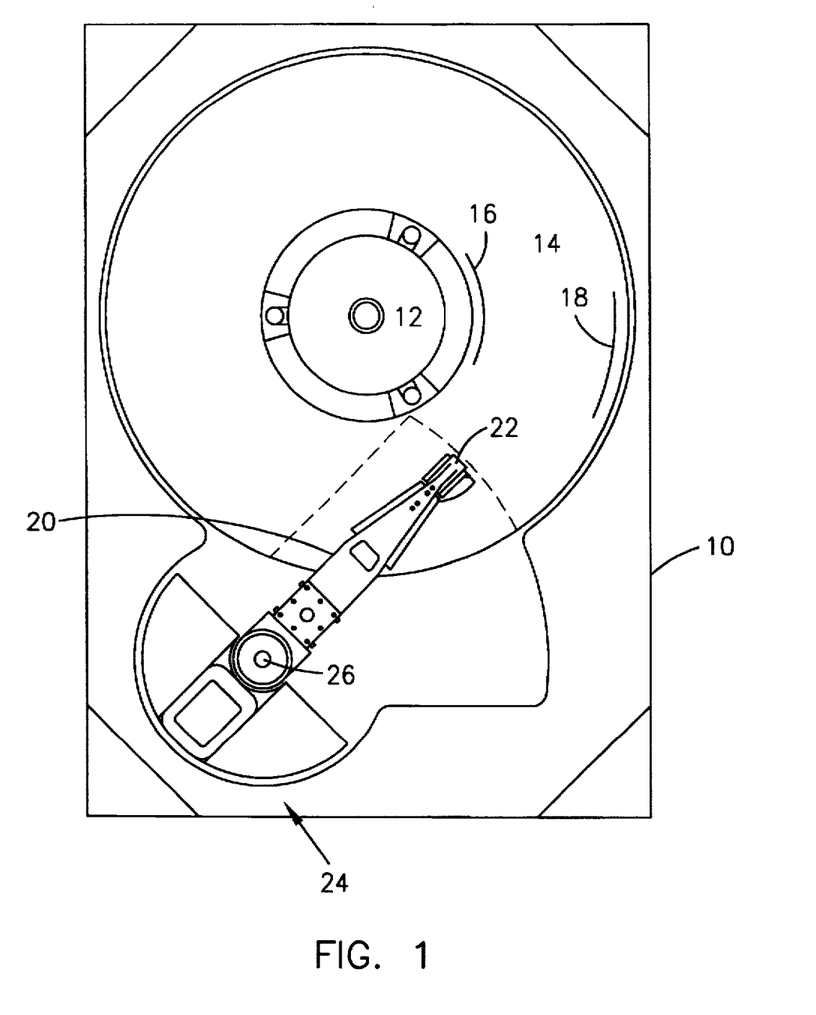
FIG. 1 is a top plan view of a disc drive which is included to show the basic elements of a disc drive in which adhesiveless motors of the type disclosed herein are especially useful.

FIG. 1 will first be described as it shows the general environment in which this invention is especially useful. This is not to say that the usefulness of the invention is limited to disc drives; motors built in accordance with these principles are useful in many other environments.

Turning to FIG. 1, the figure comprises a top plan view of a disk drive which may utilize either the spindle motor or pivot assembly or both of the present invention. As such, the disk drive includes a housing 10 including a spindle motor generally indicated at 12 for supporting one or more disks 14 for rotation by the spindle motor. A plurality of tracks ranging from the inner radius 16 to the outer radius 18 of each disk stores data on an appropriate prepared surface of the disk 14. An actuator arm 20 supports a transducer 22 which is selectively positioned over any one of the tracks by a voice coil motor shown generally at 24.

Accurate positioning of the transducer over one of the tracks requires, among other things, a reliable pivot assembly 26 which does not wobble or distort or shift the relative position of the arm in any way. Similarly, it would be highly damaging to accurate positioning of the arm over a desired track if the spindle motor did not rotate at a constant speed, or was distorted or allowed wobbling of the disks about the rotating spindle in any way. Finally, as discussed above, it is essential to functioning of modern disk drives that the sealed housing 10 which is shown broken away in this particular view does not include any contaminants such as can be frequently introduced by the out-gassing or other deterioration of an adhesive used to hold the spindle motor or pivot shaft assembly together. Thus the need for the present invention.

An exemplary spindle motor with which the present invention is especially useful appears in the vertical section of FIG. 2A. As will immediately be apparent to a person of skill in the art, many of the details including coils, magnet and control wires do not appear in this figure. The reason for these omissions is that the method of assembly of the spindle motor disclosed and claimed herein is not limited to motors of a specific design, whether fixed shaft or rotating shaft or having other unique characteristics.

The basic elements of the motor which appears in FIG. 2A include a shaft 20, upper bearing 22 and lower bearing 24 separated by a spacer 26, the outer races of the bearings 22, 24 supporting a sleeve 28. The sleeve in turn supports a stator 30 whose windings interact with a magnet 32 supported on the inner vertical surface of the hub 34 to cause rotation of the hub. The hub will support the discs for rotation within the head disc assembly.

Referring specifically to FIG. 2B, this figure shows how the upper bearing 22 has its inner race 22i resting against a shoulder of the hub 20. The outer race 22o of the same bearing rests against a shoulder 38 at the upper end of the sleeve 28. The dotted line 40 represents the approximate direction of the preload force which is to be established through this bearing after the bearing retainer 50 is inserted in place. Similar dotted lines 42, 44, 46 are shown in the upper and lower bearings 22 and 24 to indicate the desired direction of the preload force applied from the outer race through the ball bearing to the inner race of each bearing. By achieving preload forces of this orientation, the stability of the rotating shaft 20 is enhanced.

These preload forces are achieved by inserting the bearing preload spacer 50 (shown in FIG. 2C) at the bottom of the stacked bearing assembly with its raised shoulder 52 pressing against the outer race of the bearing 24. In assembling the relevant portions of the spindle motor, the upper bearing 22 is put in place against the shoulder 36 of the hub with the outer race resting against the shoulder 38 of the sleeve 28. The sleeve 28 is held in place in a fixture or the like so that it does not move with the pressure to be brought against the bearings. It can be seen as marked in FIG. 2A that there is a slip fit tolerance between the outer surface of the outer race 22o and the inner surface of sleeve 28. Next the spacer 26 is slipped over the shaft 60, butted up against the inner race 22i of the upper bearing 22. The lower bearing 24 is then slipped in place over the shaft 60, with the outer race slipping inside the sleeve 28. Finally, the rim or shoulder 52 of the bearing preload spacer 50 is pressed against the outer race of the bearing 24 with sufficient force to preload the lower bearing, altering the contact point between the outer race 24o and the balls 70 within the ball bearing so that the preload identified by the lines of force 42, 44 is achieved. Because of the presence of the spacer 26 between the inner races of the bearings 22, 24 and the fact that the upper outer shoulder of the upper outer portion of the outer race of the upper bearing presses against the shoulder 38 of the sleeve 28, a similar preloading effect is achieved for the upper bearing 22 when the spacer 50 is held in place.

Of course, the critical issue is how to retain this bearing preload spacer 50 in place against the outer races of the bearings, maintaining the preload condition which has now been established. According to the principles of this invention, it is preferably achieved by dramatically cooling the temperature of the preload spacer 50 relative to the temperature of the sleeve 28 in which it is placed. This shrinks the diameter 80 of the spacer 50 relative to the diameter of the opening 82 defined by the sleeve 28. The spacer 50 is now inserted in the sleeve, with its shoulder 52 pressed against the outer race of the bearing 24. As the spacer 50 returns to normal temperature, it expands, creating an interference fit with the sleeve 28 in which it has been inserted so that its axial position remains fixed. Over time, as the sleeve and spacer are subjected to varying temperatures, their coefficients of thermal expansion are either the same (if the sleeve and spacer are of the same material) or are nearly the same and the interference fit is not disturbed and the preload is maintained.

Alternatively, as part of the sequence of fitting the spacer into the sleeve, the size or diameter of the opening 82 defined by the sleeve 28 may in fact be expanded by heating the sleeve while the cooled spacer is inserted, thereby making insertion easier.

Referring next to FIG. 3, the results of a finite element analysis of the effectiveness of the bearing preload spacer 50 are shown in FIG. 3. Two configurations were evaluated, aluminum and steel. The disc 50 inserted into the sleeve 28 is shown in cross section. In the example, the disc and sleeve were modeled with 8-node elements in a 2-D axisymmetric configuration. The interface between the disc and the sleeve was modeled with 2-D point to point contact elements. These elements allow an initial interference condition to be specified. The amount of initial interference is determined by calculating the thermal shrinkage of the disc after it is cooled to the assembly temperature. After assembly of the disc and sleeve, the model was evaluated at three temperatures, −40° C., +25° C., and +70° C. The normal value of stress (SX) at the interface was averaged over the appropriate nodes, and a normal diametral force was calculated by multiplying the average value of this stress component times the interface area (19.2 mm$^2$). The axial restraining force was calculated by multiplying the normal force by a coefficient of friction of 0.3.

Results:

Case 1: Aluminum spacer, inserted at −70° C. [100° F.]
initial radial interference = .0077 mm at 25° C.

| Operating Temp (°C.) | Axial retaining force (lb) | Peak stress (in sleeve) Mpa |
| --- | --- | --- |
| −10 | 44 | 219 |
| 25 | 61 | 305 |
| 70 | 74 | 362 |

Case 2: Steel spacer, inserted at −100° C.
initial radial interference = .0063 mm at 25° C.

| Operating Temp (°C.) | Axial retaining force (lb) | Peak stress (in sleeve) Mpa |
| --- | --- | --- |
| −40 | 70 | 335 |
| 25 | 70 | 335 |
| 70 | 70 | 335 |

Of the two configurations, the steel disk is preferred for three reasons:

1. The retaining force does not vary with temperature.
2. Tight tolerances (required with this approach) are easier to maintain with steel.
3. Compared to aluminum, steel has higher heat capacity and lower thermal conductivity. This will allow more time for assembly.

Fairly tight tolerances are required for this design approach, probably on the order of ±2 μm (diametral), the diametral interference would decrease from 0.012 mm to 0.004 mm. The retaining force would decrease in a linear fashion to ⅓×70 lb=23 lb.

An alternative embodiment to that described with respect to FIG. 2 is shown in the partial sectional view of FIG. 4. In this particular embodiment, the preload is set and maintained at the outer race using a similar bearing retainer which will be heated to a higher temperature than the parts over which it is press fit; the retainer is then pushed over the bearing outer race and sleeve outer diameter to set and maintain the required preload. After the outer retainer ring cools to room temperature, the preload is set and the parts are in a press fit condition.

Referring specifically to the features shown in FIG. 4 the lower bearing 24 is shown with its inner race captured under a shoulder 80 of shaft 60. Alternatively, this race could be supported under a spacer 26 which is slip fit over the shaft 60 as shown in FIG. 2a. The outer race of the lower bearing is in a slip fit relationship with the sleeve 28. In this embodiment, the sleeve 28 terminates above the lower end of the outer race 24o so that the retainer 90 can contact the outer race with a raised shoulder 92 which is provided on each side of the retainer. This shoulder contacts the surface, and preferably the entire lower surface of the outer race, in order to exert the desired force on this race to define the contact point between the race and the ball bearing 94 so that the lines of force 42 44 explained with respect to FIG. 2a are established, creating the necessary preload condition to stabilize the shaft. As noted above, a dramatic heating of the retainer 90 relative to the sleeve 28 will cause sufficient lateral expansion of the inner diameter of the retainer 90 relative to the outer diameter of the sleeve 28 so that the retainer can be slipped over the outer surface of the sleeve and pressed in place against the lower race 24 of the bearing. On cooling, the preload is set and the parts are in a press fit condition as desired.

It is expected that the necessary heat differential would be achieved by heating the retainer 90 to approximately 120° C., while maintaining the sleeve at room temperature.

Yet another alternative is shown in FIG. 5. As with the previous embodiments, setting the preload for the bearing supporting the shaft utilizes thermal contraction to create a gap between a plug and a hollow shaft into which it is inserted, wings on the end of the plug supporting the inner races of the bearings and applying a preload force to the bearings. When the temperatures differences have dissipated, and the plug and the material defining and the opening into which the plug is inserted have reached room or operating temperature, the bearings are maintained in the preload state and the parts are held together in a press fit condition.

In the embodiment of FIG. 5, the shaft 60 includes an annular extension 100, defining an opening into which the preload plug 120 can be inserted. In this embodiment, the sleeve 128 includes internal shoulders 132 which cooperate with the outer races of the bearings to properly locate these bearings and to convey the preload force from the lower bearing 24 to the upper bearing 122. The plug includes wing-like extensions 130 which support the lower surface of the inner race of the bearings when the plug is put in place. After placement, it can be seen that a force will now be exerted against the inner race of the bearings and conveyed through the ball of the lower bearing to the outer race and in turn through the outer race of the upper bearing 122 to the balls of that bearing and to the inner race. The preload force is represented in this embodiment by the lines 142 and 140. In this embodiment, the preload is set up by a pressure on the inner races of the lower bearing rather than the outer races, so that the preload does function in a different manner than in the other embodiments but still is effective to provide the necessary support and stability for the motor shaft.

Other embodiments to the present invention may become apparent to a person of skill in the art who studies the present invention disclosure. Therefore, the scope of the present invention is to be limited only by the following claims.

What is claimed:

1. A spindle motor comprised of a hub rotating with a central shaft, said shaft rotating within a sleeve, and a bearing arranged radially between said shaft and said sleeve, said bearing including a pair of bearing members each with inner and outer races and spherical bearings therebetween, said bearing members being arranged with a predetermined axially defined space therebetween, and retainer means pressed against one of said pair of bearing members to retain both of said pairs of bearing members in their location along said shaft and to preload said bearing members to maintain said shaft in a fixed orientation relative to said sleeve, said retainer means comprising a single piece unitary preload spacer having a slip fit tolerance of its outer surface relative to an inner surface of said sleeve being fixed solely by an interference fit within said sleeve by virtue of having been cold shrunk to a smaller diameter than a diameter defined by said sleeve, and after having been located within said sleeve and against one of said pair of bearing members, being allowed to return to substantially the same temperature as said sleeve such that the preload spacer expands providing an adhesiveless interference fit between the preload spacer and the sleeve.

2. A spindle motor as claimed in claim 1 wherein said predetermined axially defined space between said pair of axially separated bearing members is defined and fixed by a sleeve slip fit over said central shaft to fill said space between said one and the other of said pair of bearing members, said sleeve resting against the inner race of each of said bearing members.

3. A spindle motor as claimed in claim 1 wherein said inner race of one of said pair of bearing members rests against a shoulder on said hub where said hub meets said central shaft.

4. A spindle motor as claimed in claim 3 wherein said outer race of said one of said bearing members rests against a shoulder of said sleeve spaced from said hub, said outer race of said one of said bearing members being located against said sleeve but not adhesively joined thereto to maintain a vertical spaced relationship between said sleeve and said central shaft.

5. A spindle motor as claimed in claim 1 wherein prior to inserting said retainer means against said bearing members, said sleeve is heated above ambient temperature to increase the temperature differential between said sleeve and said cooled retainer means in order to create a difference in diameters between the inner diameter of said sleeve and the outer diameter of said preload spacer to allow said preload spacer to be fitted within said sleeve.

6. A spindle motor as claimed in claim 1 wherein said preload spacer is pressed against the outer races of one of said bearing members.

7. A spindle motor as claimed in claim 1 wherein said sleeve and said preload spacer are each formed of steel.

8. A spindle motor as claimed in claim 1 wherein said sleeve is formed of steel and said preload spacer is formed of aluminum or steel.

9. Apparatus for critically positioning a pair of bearings arranged radially along a rotating shaft, said bearings including a pair of bearing members each with a grooved inner and outer race and spherical bearings therebetween, said bearing members being arranged with a predetermined axial space therebetween and having inner races adjacent said shaft and outer races adjacent a sleeve within which such shaft rotates, a first one of said pair of bearing members being axially fixed in location by being pressed against a shoulder of said sleeve and/or a shoulder of said shaft, a second of said pair of bearing members axially spaced from said first of said pair of bearing members also having an inner race adjacent said rotating shaft and an outer race adjacent said sleeve, said second one of said bearing members being axially located within said sleeve by a single piece unitary spacer located against said second one of bearing members having a slip fit tolerance of its outer surface relative to an inner surface of said sleeve and retained in position solely by an interference fit within said sleeve by having been shrunk to a smaller than an ambient temperature diameter and then allowed to expand such that said second one of said bearing members is press fit within the diameter of said sleeve.

10. Apparatus as claimed in claim 9 wherein said sleeve is formed of steel and said retainer is formed of aluminum or steel.

11. Apparatus as claimed in claim 9 wherein said spacer has a raised outer edge so that said spacer is pressed against the outer races of said second one of said bearing members, holding said second one of said bearing members in place and preloading said bearing members against said shaft to maintain the orientation of said shaft for rotation within said sleeve.

12. A spindle motor comprised of a hub rotating with a central shaft said shaft rotating within a sleeve, and a bearing means arranged radially between said shaft and said sleeve, said bearing means including a pair of bearing members each with inner and outer races and spherical bearings therebetween, said bearing members being arranged with a predetermined axially defined space therebetween, and retainer means pressed against one of said pair of bearing members to retain both of said pairs of bearing members in their location along said shaft and to preload said bearing members to maintain said shaft in a fixed orientation relative to said sleeve, said retainer means comprising a single piece unitary bearing preload spacer having an upraised upper edge around its diameter and having a slip fit tolerance of its inner diameter surface relative to an outer surface of said sleeve and having been forced over an outer diameter of said shaft after having been heated to expand to a greater diameter than said sleeve and then allowed to cool to a temperature substantially the same as said sleeve so that the inner diameter of said spacer and the outer diameter of said sleeve are about the same so that said retainer means is retained solely by an interference fit in place over said sleeve.

13. A spindle motor as claimed in claim 12 wherein said predetermined axially defined space between said pair of axially separated bearing members is defined and fixed by an inner sleeve slip fit over said central shaft to fill said space between said one and the other of said pair of bearing members, said inner sleeve resting against the inner race of each of said bearing members.

14. A a spindle motor as claimed in claim 12 wherein said inner race of one of said pairs of bearing members rests against a shoulder on said hub where said hub meets said central shaft to fix the axial location of said bearing member along said shaft.

15. A spindle moor as claimed in claim 14 wherein said outer race of said one of said bearing members rests against a shoulder of said sleeve spaced from said hub, said outer races of said bearing members being pressed against said sleeve but not adhesively joined thereto to maintain a vertical s relationship between said sleeve and said central shaft.

16. A spindle motor as claimed in claim 12 wherein prior to inserting said retainer means against said bearing members, said retainer means is heated above ambient temperature to increase the temperature differential between said sleeve and said cooled retainer in order to create a difference in diameters between the outer diameter of said sleeve and the inner diameter of said spacer such that said spacer is fitted over said sleeve.

17. A spindle motor as claimed in claim 12 wherein said retainer means is pressed against the outer races of one of said bearing members.

18. A spindle motor as claimed in claim 12 wherein said sleeve and said retainer means are each formed of steel.

19. A spindle motor as claimed in claim 12 wherein said sleeve is formed of steel and said retainer means is formed of aluminum or steel.

20. A bearing cartridge comprising a shaft rotating within a sleeve, and a pair of bearings arranged radially between said shaft and said sleeve, each of said bearings with inner and outer races and spherical bearings therein, said bearings being arranged with a predetermined axially defined space therebetween, and retainer means pressed against one of said pair of bearings to retain both of said pairs of bearings in their location along said shaft and to preload said bearings to maintain said shaft in a fixed orientation relative to said sleeve, said retainer means comprising a single piece unitary preload spacer being fixed solely by an interference fit within said sleeve by virtue of having been cold shrunk to a smaller diameter than a diameter defined by said sleeve, and after having been located within said sleeve and against one of said pair of bearings, being allowed to return to substantially the same temperature as said sleeve.

21. A bearing cartridge as claimed in claim 20, wherein said axial space between said pair of axially separated bearings is defined and fixed by an inner sleeve slip fit over said rotating shaft to fill said space between said one and the other of said pair of bearings, said inner sleeve resting against the inner race of each of said bearings.

22. A bearing cartridge as claimed in claim 21 wherein said inner race of one of said pairs of bearings rests against a shoulder on a hub where said hub meets said rotating shaft to fix the axial location of said bearings along said shaft.

23. A bearing cartridge as claimed in claim 22 wherein said outer race of said one of said bearings rests against a shoulder of said sleeve spaced from said hub, said outer race of said bearings being located against said sleeve but not adhesively joined thereto to maintain a vertical spaced relationship between said sleeve and said rotating shaft.

24. A bearing cartridge as claimed in claim 20 wherein prior to inserting said retainer means against said bearings, said sleeve is heated above ambient temperature to increase the temperature differential between said sleeve and said cooled retainer means in order to create a difference in diameters between the inner diameter of said sleeve and said outer diameter of said spacer to allow said spacer to be fitted within said sleeve.

25. A bearing cartridge as claimed in claim 20 wherein said preload spacer is pressed against the outer races of one of said bearings.

26. A bearing cartridge as claimed in claim 20 wherein said sleeve and said preload spacer are each formed of steel.

27. A bearing cartridge as claimed in claim 20 wherein said sleeve is formed of steel and said preload spacer is formed of aluminum or steel.

28. A bearing cartridge comprising a hub member rotating with a central and within a sleeve, and a bearing means arranged radially between said shaft and said sleeve, said bearing means including a pair of bearing members each with inner and outer races and spherical bearings therebetween, said bearing members being arranged with a predetermined axially defined space therebetween, and retainer means pressed against one of said pair of bearing members to retain both of said pairs of bearing members in their location along said shaft and to preload said bearing members to maintain said shaft in a fixed orientation relative to said sleeve, said retainer means comprising a single piece unitary spacer having an upraised upper edge around its diameter and having been forced over an outer diameter of said shaft after having been heated to expand to a greater diameter than said sleeve and then allowed to cool to a temperature substantially the same as said sleeve so that the inner diameter of said retainer means and the outer diameter of said sleeve are about the same so that said retainer means is retained in place over said sleeve.

29. A bearing cartridge as claimed in claim 28 wherein said axial space between said pair of axially separated bearing members is defined and fixed by a spacer sleeve slip fit over said rotating shaft to fill said space between said one and the other of said pair of bearing members, said spacer sleeve resting against the inner race of each of said bearing members.

30. A bearing cartridge as claimed in claim 28 wherein said inner race of one of said pairs of bearing members rests against a shoulder on said hub member where said hub member meets said rotating shaft to fix the axial location of said one of said bearing members along said shaft.

31. A bearing cartridge as claimed in claim 30 wherein said retainer means is pressed against the outer races of said one of said bearing members.

32. A bearing cartridge as claimed in claim 30 wherein said sleeve and said retainer means are each formed of steel.

33. A bearing cartridge as claimed in claim 30 wherein said sleeve is formed of steel and said retainer means is formed of aluminum or steel.

34. A bearing cartridge as claimed in claim 28 wherein said outer race of said one of said bearing means rests against a shoulder of said sleeve spaced from said hub member, said outer race of said bearing members being pressed against said sleeve but not adhesively joined thereto to maintain a vertical spaced relationship between said sleeve and said rotating shaft.

* * * * *

UNITED STATES PATENT AND TRADEMARK OFFICE
CERTIFICATE OF CORRECTION

PATENT NO. : 5,801,902
DATED : September 1, 1998
INVENTOR(S) : Kloeppel et al.

It is certified that error appears in the above-identified patent and that said Letters Patent is hereby corrected as shown below:

Title page, at [54], line 2, following "THERMAL", delete [EXSPANSION] and insert -- EXPANSION --.

Title page, at [75], line 3, following "Klaus Dieter", delete [Koeppel] and insert -- Kloeppel --.

Signed and Sealed this

First Day of December, 1998

BRUCE LEHMAN

Attest:

Attesting Officer

Commissioner of Patents and Trademarks